(12) United States Patent
Ritter et al.

(10) Patent No.: US 10,106,454 B2
(45) Date of Patent: Oct. 23, 2018

(54) OPTICAL GLASS HAVING NEGATIVE ANOMALOUS PARTIAL DISPERSION / SPECIAL SHORT FLINT GLASSES

(71) Applicant: SCHOTT AG, Mainz (DE)

(72) Inventors: Simone Ritter, Mainz (DE); Bianca Schreder, Sulzbach (DE); Ute Woelfel, Mainz (DE); Stefanie Hansen, Gensingen (DE)

(73) Assignee: SCHOTT AG, Mainz (DE)

( * ) Notice: Subject to any disclaimer, the term of this patent is extended or adjusted under 35 U.S.C. 154(b) by 0 days.

(21) Appl. No.: 15/355,845

(22) Filed: Nov. 18, 2016

(65) Prior Publication Data

US 2017/0137317 A1    May 18, 2017

(30) Foreign Application Priority Data

Nov. 18, 2015  (DE) .................. 10 2015 119 942

(51) Int. Cl.
  *C03C 3/097*   (2006.01)
(52) U.S. Cl.
  CPC .................................. *C03C 3/097* (2013.01)
(58) Field of Classification Search
  CPC ......... C03C 3/064; C03C 3/066; C03C 3/068; C03C 3/097
  See application file for complete search history.

(56) References Cited

U.S. PATENT DOCUMENTS

| 4,980,318 A | * | 12/1990 | Araujo | .................... C03C 3/064 |
| | | | | 501/13 |
| 5,858,898 A | * | 1/1999 | Nakahara | ................ C03C 3/064 |
| | | | | 501/77 |
| 2004/0033880 A1 | | 2/2004 | Naumann et al. | |
| 2008/0300125 A1 | * | 12/2008 | Wolff | ..................... C03C 3/097 |
| | | | | 501/64 |

FOREIGN PATENT DOCUMENTS

| DE | 10225366 | 3/2004 |
| DE | 102007025601 | 12/2008 |
| WO | 9714661 | 4/1997 |
| WO | 0172650 | 10/2001 |

\* cited by examiner

*Primary Examiner* — Noah S Wiese
(74) *Attorney, Agent, or Firm* — Ohlandt, Greeley, Ruggiero & Perle, L.L.P.

(57) ABSTRACT

The present invention relates to optical glasses, in particular special short flint glasses (KZFS) and optical elements and components, which comprise these glasses, and use thereof and a method for producing such optical glasses. The optical glasses of the present invention are characterized by a pronounced short flint character and additionally by an excellent transmission and chemical resistance and workability. At that, the glasses of the invention can stand out due to lower costs of production caused by lower costs of raw materials and lower processing costs, due to their crystallization properties that can be handled also in smaller melting aggregates, and due to good environmental compatibility.

22 Claims, 1 Drawing Sheet

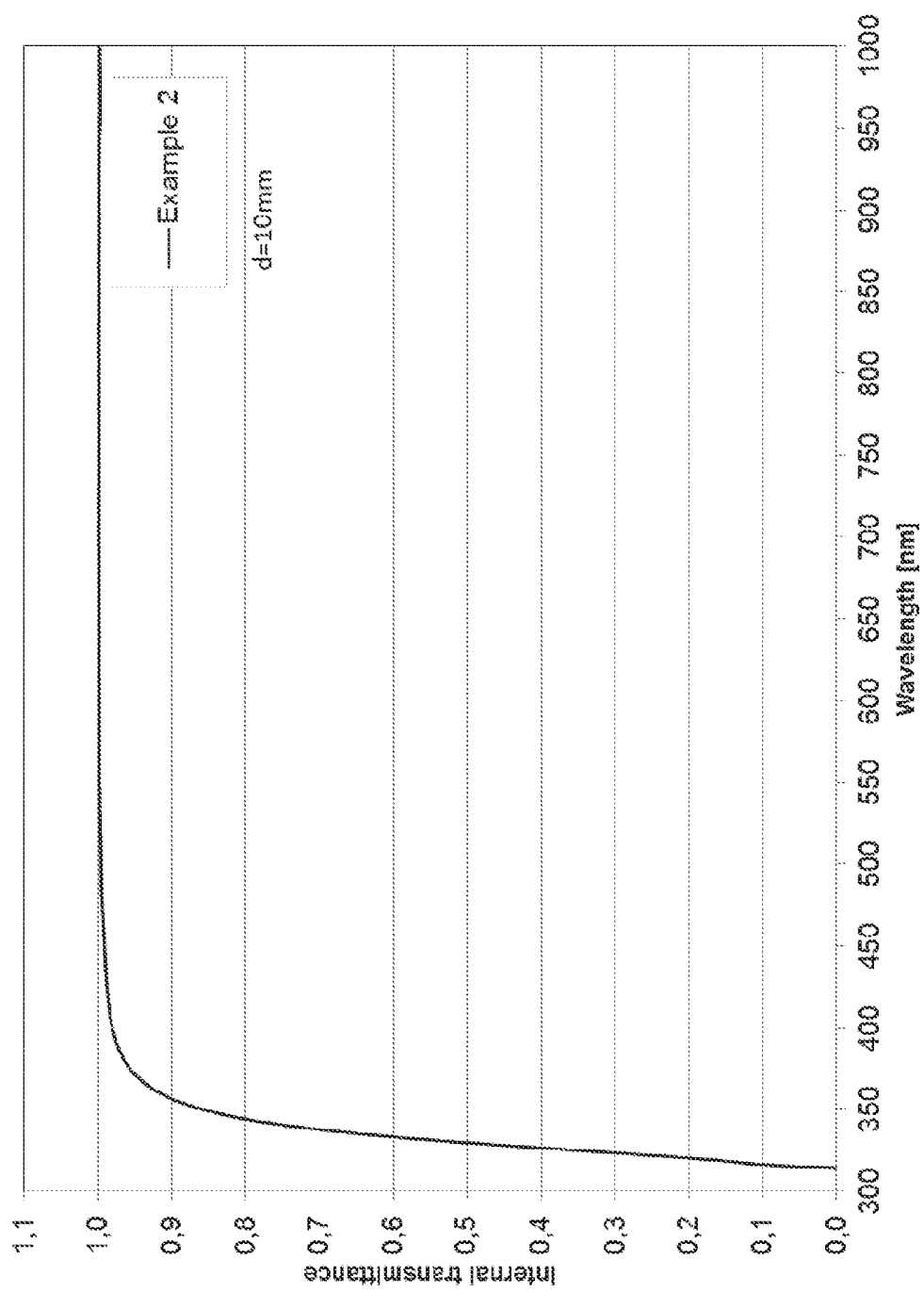

OPTICAL GLASS HAVING NEGATIVE ANOMALOUS PARTIAL DISPERSION / SPECIAL SHORT FLINT GLASSES

CROSS-REFERENCE TO RELATED APPLICATIONS

The present application claims the benefit of German Patent Application No. 10 2015 119 942.4, filed on Nov. 18, 2015, which is incorporated herein by reference.

BACKGROUND OF THE DISCLOSURE

1. Field of the Disclosure

The present invention relates to optical glasses, in particular to special short flint glasses (German: Kurzflintsondergläser (KZFS)) and optical elements and components, which comprise these glasses, as well as use thereof and a method for production of such optical glasses.

2. Description of the Related Art

Correction of chromatic aberration is an important issue in optical systems of high quality already from the design of the system on. Glasses with pronounced short-flint properties are indispensable for an excellent correction of chromatic aberrations. Such glasses are glasses that have a relative partial dispersion that deviates significantly from the normal line so that the glasses are particularly suitable for correction of chromatic abberations.

Common optical glasses and their optical applications as object lenses, for digital projection (for example objectives, binoculars, microscopes, projectors, mobile phone cameras, mobile drive) often do not fulfill the properties of a negative anomalous partial dispersion and/or the requirements of a high chemical resistance.

Moreover, provision of optical glasses is desirable that have a content of lead and arsenic as low as possible and that are preferably even free of lead and arsenic because these components have been classified as pollutive components. Furthermore, the economic efficiency of a glass is more and more getting into the focus of attention of glass producers and producers of optical instruments and products. Therefore, it is also desirable that raw materials, which are on a high price level due to globally and also locally limited reserves, as for example Ta raw materials and $GeO_2$, are as much as possible reduced as component in a glass or preferably even avoided. Thereby it would also be ensured that such a glass can be provided in the future. Furthermore, glasses with increased chemical resistance are continuously getting more and more important in products of high quality.

In particular, only a part of the chromatic aberration can be eliminated in lens systems by combination of glasses having differing Abbe numbers. The remaining chromatic aberration, the so called secondary spectrum, is reduced by applying glasses having strongly deviating partial dispersions. The latter means the combination of glasses which have a negatively deviating partial dispersion with glasses which have a positively deviating partial dispersion in a lens system.

Often this optical property of negatively deviating anomalous partial dispersion is caused by use of PbO and/or $Ta_2O_5$, which should be avoided or reduced as much as possible for the above-mentioned ecological and economical reasons.

However, PbO and $Ta_2O_5$ are components, which are able to cause a particularly small anomalous partial dispersion. A reproduction of the desired optical and glass-technological properties influenced by PbO and/or $Ta_2O_5$ can normally not be achieved by a simple replacement by one or more components. Instead, new developments or far-reaching changes in the glass composition are necessary.

Known lead-free and/or tantalum-free glasses of the desired optical position are normally based on use of very high amounts of alkali oxides and/or $B_2O_3$ in a silicate matrix, which usually results in a glass with low resistance against acids and/or alkaline solutions. Moreover, known glasses, which have a similar optical position as the one achieved according to the present invention or which have a comparable chemical composition, have significant disadvantages, in particular in direct comparison with the glasses of the present invention:

The combination of components of the glasses described in document DE 10 2007 025 601 A1 does not result in a glass, which combines all optical and simultaneously physical properties. Moreover, the glass is described as a "short" glass having the feature that $T(T(\|)$ at $10^{7.6} - T( )$ at $10^{13})$ is at most 150 K. The glasses of the invention have $_-$ T>150 K due to the lack of ZnO and the obligatory presence of the oxide of calcium in the document. Furthermore, the content of $B_2O_3$ is too low in the glass.

Document DE 102 25 366 discloses glasses having higher contents of $SiO_2$ and lower contents of $B_2O_3$, which moreover obligatorily contain $ZrO_2$ in an amount of more than 10 to 20% by weight. This combination leads to a glass having $T_g$ of significantly higher than 560° C. Moreover, the melting temperatures are increased, which is economically inefficient. Furthermore, it is not readily possible that such a glass is further processed by re-pressing. Glasses disclosed in document WO 01/72650 A1 obligatorily contain $Nb_2O_5$ of from 20 to 50% by weight. This component is useful for increasing the refractive index and reducing the Abbe number. However, with these amounts an advantageous optical refractive index position cannot be achieved. Furthermore, $Nb_2O_5$ is a redox-sensitive component and leads to glasses having impaired transmittance.

It is an object of the invention that the above-described disadvantages are overcome.

SUMMARY OF THE PRESENT DISCLOSURE

In particular, it is a further object of the present invention that optical glasses are provided, in particular special short flint glasses, or a compositional range is provided for such optical glasses, which have an advantageous negatively deviating partial dispersion, an advantageous refractive index $n_d$ and an advantageous Abbe number $\cup_d$, and which are furthermore comparably crystallization-resistant, well producible and have very good resistance classes according to ISO 8424 (acid resistance (German: Saureresistenz) SR, Second Issue of Jun. 15, 1996) and ISO 10629 (alkaline resistance (German: Alkali-resistenz) AR, First Issue of Jul. 1, 1996).

In the glasses of the invention, use of expensive, limitedly available and/or transmittance-reducing components should be reduced, preferably even completely avoided, in favor of inexpensive and available materials that are not absorbing in the applied transmittance range. In particular, due to ecological and economic considerations use of PbO and/or $As_2O_3$ and if possible also $Bi_2O_3$, preferably also $TiO_2$-, $Gd_2O_3$-, $Y_2O_3$-, $GeO_2$-, $Ta_2O_5$-, $Al_2O_3$-, $WO_3$-, ZnO-, BaO-, and/or F-contents should be reduced, preferably avoided, wherein the desired optical properties should nevertheless be achieved. At the same time the glasses should have excellent transmittance and chemical resistance and a pronounced short flint character. These glasses should if possible be processable in a pressing process and have applicationoriented low transformation temperatures $T_g$, in particular also with regard to the further processing. Furthermore, the glasses should be well meltable and processable, and have a sufficient crystallization-resistance, which enables a production in continuously conducted aggregates.

Such glasses should in particular be suitable for use in the application fields imaging as lenses in objectives for digital projection (for example objectives, binoculars, microscopes, projectors, mobile phone cameras, mobile drive), sensor technology, medical technology, photolithography, laser technology, Wafer/Chip-Technology, as well as for telecommunication, optical telecommunications and optics/illumination in automotive sector. These and other objects are solved by the subject-matter of the enclosed independent claims. In particular, these and other objects are solved by a glass of claim 1 and the use of such a glass for the production, for or in optical elements of claim 9. Preferred embodiments are contained in the dependent claims.

An optical glass of claim 1 comprises the following composition in % by weight based the oxides:

| | |
|---|---|
| $SiO_2$ | >38-47 |
| $B_2O_3$ | >12-17 |
| $SiO_2 + B_2O_3$ | ≥50-65 |
| $ZrO_2$ | ≥10 |
| $Nb_2O_5$ | 0-20 |
| $\Sigma R_2O$ (R = Li, Na, K) | >10-14 |

A glass of the invention is in particular characterized by a good chemical resistance, is comparably crystallization-resistant, relatively easily producible and has additionally a very good resistance class according to ISO 8424 (Second Issue of Jun. 15, 1996) and ISO 10629 (First Issue of Jul. 1, 1996).

The optical glasses of the present invention are preferably special short flint glasses (short: KZFS).

DESCRIPTION OF THE FIGURES

FIG. 1 shows the internal transmittance curve of example glass 2 at a sample thickness of 10 mm. The internal transmittance (y-axis) is shown for different wavelengths (x-axis).

DETAILED DESCRIPTION OF THE DISCLOSURE

According to the invention, terms such as at "most" or not "exceed" related to the indication of an amount of a component contained in the glass should mean that this component may be present up to this amount but also in smaller amounts (mathematically: ≤). The skilled person will freely choose a suitable range between the indicated lower and upper limits, which is valid for all components of the glasses of the invention discussed in the following.

If not indicated otherwise, indications and amounts refer to the amount of a component in % by weight based on the oxide. Indications of ratios relate to mass ratios if not indicated otherwise.

According to another embodiment of the present invention, the glass of the invention is preferably free of components other than the components indicated above or below, that means that in such embodiments the glass essentially consists of the components indicated above or below. According to an embodiment of the present invention, the glass of the invention consists to at least 90% by weight, more preferably at least 95% by weight, even more preferably to at least 99% by weight of the indicated components.

In the following, the term "X-free" or "free of a component X" means that the glass does essentially not contain this component X, that means that such a component is at most present as contaminant in the glass and is not added to the glass composition as a single component. This means that the component X is not added in substantial amounts.

Non-substantial amounts according to the invention are amounts of less than 100 ppm, preferably less than 50 ppm and most preferably less than 10 ppm. In this respect, X stands for any component, as for example PbO, $As_2O_3$, $Ta_2O_5$ or $GeO_2$.

The Abbe number $v_d$ is used as a measure for the dispersion of an optical glass between the wavelengths F at λ 486.13 nm and C at λ 656.27 nm, which is calculated according to equation (1). The symbols $n_d$, $n_F$ and $n_C$ are therein the refractive indices at the wavelengths d (λ=587.56 nm), F (λ=486.13 nm) and C (λ=656.27 nm).

$$v_d = \frac{nd-1}{nF-nC} \quad \text{Equation (1)}$$

The relative partial dispersion in the blue region is preferably calculated by the factor $P_{g,F}$ according to equation (2). The wavelength g corresponds therein to λ 435.83 nm.

$$P_{g,F} = \frac{ng-nF}{nF-nC} \quad \text{Equation (2)}$$

The position of the normal line, on which the majority of the optical glasses is approximately positioned, is defined by pairs of values of the glass types K7 and F2 (SCHOTT catalogue "Optisches Glas" (English: "Optical Glass") 2014). Der intersection point $\tilde{P}_{g,F}$ with the straight line at a given Abbe number is calculated according to equation (3).

$$\tilde{P}_{g,F} = 0.6438 - 0.001682 * v_d \quad \text{Equation (3)}$$

The term $\Delta P_{g,F}$, as used herein, is the difference of $\tilde{P}_{g,F}$ and $P_{g,F}$ of the glass, according to equation (4).

$$\Delta P_{g,F} = P_{g,F} - \tilde{P}_{g,F} \quad \text{Equation (4)}$$

The term "negatively deviating anomalous partial dispersion" as used herein preferably indicates a value $\Delta P_{g,F} < 0$.

Preferably, a glass of the present invention has a refractive index $n_d$ of at least 1.60, further preferably of at least 1.61 and even further preferably of at least 1.612. The refractive index $n_d$ ist herein preferably at most 1.625, more preferred at most 1.616 and even more preferred at most 1.615. Particularly preferred is a refractive index $n_d$ of from 1.60 to 1.625, more preferred of $1.61 \leq n_d \leq 1.62$, and even more preferred of $1.612 \leq n_d \leq 1.616$. A glass of the present invention has preferably a negatively deviating anomalous partial dispersion of $\Delta P_{g,F}$ of at most −0.0055, more preferred at most −0.0060 and even more preferred at most −0.0065. Preferably, the negatively deviating anomalous partial dispersion $\Delta P_{g,F}$ is at least −0.0119, further preferred at least −0.0110, even further preferred at least −0.0100 and even further preferred at least −0.0098. Particularly preferred is a negatively deviating anomalous partial dispersion of $\Delta P_{g,F}$ of −0.0119 ≤ $\Delta P_{g,F}$ ≤ −0.0055, further preferred of −0.0110 ≤ $\Delta P_{g,F}$ ≤ −0.0055, even further preferred of −0.0100 ≤ $\Delta P_{g,F}$ ≤ −0.0060 particularly preferred of −0.0098 ≤ $\Delta P_{g,F}$ ≤ −0.0065. Glasses having such negatively deviating anomalous partial dispersion are particularly suitable for correction of chromatic aberration.

Preferably, a glass of the present invention has an Abbe number $v_d$ of at least 42.7, more preferred at least 43.0 and even more preferred at least 43.2. Preferably, the Abbe number $v_d$ is at most 45.9, more preferred at most 45.7 and even more preferred at most 45.3, particularly preferred at most 44.9. Particularly preferred is an Abbe number $v_d$ of from 42.7 to 45.9, more preferred of $43.0 \leq v_d \leq 45.7$, and even more preferred of $43.2 \leq v_d \leq 44.9$.

The glasses contain as glass formers the components $SiO_2$ and $B_2O_3$. The content of $SiO_2$ in the composition is more than 38% by weight, preferably at least 40% by weight and even more preferred at least 41% by weight. The content of $SiO_2$ in the composition is at most 47% by weight, preferably at most 46% by weight. Particularly preferred, the content of $SiO_2$ in the composition is from >38 to 47% by weight, preferably from >38 to 46% by weight, further preferred from 40 to 47% by weight, even further preferred from 40 to 46% by weight, more preferred from 41 bis 46% by weight. A lower $SiO_2$-content is not advantageous because the chemical resistance would be impaired. At higher amounts than indicated, the meltability would be impeded. $SiO_2$ supports the achievement of the refractive index position in the claimed middle range.

The content of $B_2O_3$ in the composition is more than 12% by weight, preferably more than 12.2% by weight, further preferably more than 12.3% by weight. The content of $B_2O_3$ in the composition is at most 17% by weight, preferably at most 16% by weight and further preferably at most 15% by weight. Particularly preferred, $B_2O_3$ is contained in the composition from >12 to 17% by weight, preferably from 12.2 to 17% by weight, further preferred from 12.3 to 17% by weight, more preferred from 12.5 to 16% by weight and particularly preferred 12.5 to 15% by weight. $B_2O_3$ is amongst other things a component, which dissolves difficult-to-melt components as for example $ZrO_2$ and which thereby satisfies the function as fluxing agent. Furthermore, $B_2O_3$ reduces the negative partial dispersion of the glasses. That means that the absolute value of $\Delta P_{g,F}$ is increased. For these reasons the $B_2O_3$-content must not be below >12% by weight. At higher boron oxide amounts beyond the claimed range, the aggressiveness of the melt towards the refractory material is increased, which is disadvantageous for an economic production.

Preferably, the glass of the invention contains in sum an amount of $SiO_2$ and $B_2O_3$ of at least 50 to 65% by weight, preferably of more than 50 to 65% by weight. Further preferably, the glass of the invention contains in sum an amount of $SiO_2$ and $B_2O_3$ of at least 54% by weight and even further preferred of at least 55% by weight. Further preferably, the glass of the invention contains in sum an amount of $SiO_2$ and $B_2O_3$ of at most 64% by weight, preferably at most 62% by weight and even further preferred of at most 61% by weight.

In accordance with the invention, the glasses may also comprise alkaline earth oxides. Alkaline earth oxides and ZnO serve for adjustment of the viscosity, in particular for fine-tuning of the viscosity-temperature-profile. They may in particular also serve as network modifying components just as alkali oxides. The content of the components MO of the group of alkaline earth metal oxides MgO, CaO, SrO, BaO and ZnO should in sum be preferably less than 5% by weight, preferably less than 3% by weight. In a preferred embodiment, the glasses of the invention are free of at least one component, which is selected from MgO, CaO, SrO, BaO and ZnO. Preferably, the glasses are free of MgO and SrO and ZnO. In a preferred embodiment, the glasses of the invention are free of alkaline earth oxides and ZnO.

If alkaline earth oxides are present in the glasses of the invention, it has turned out to be advantageous that the alkaline earth oxides in the glass are selected such that the mass proportion of calcium oxide is larger than the mass proportion of barium oxide and/or strontium oxide. It is particularly preferred according to the present invention, if the sum of the mass proportion of barium oxide and calcium oxide is at most 1.0% by weight.

Thereby any alkaline earth oxide component, except for CaO, may be present in the glass as individual component up to at most 4% by weight, preferably at most 3% by weight, further preferred at most 2% by weight. CaO is contained optionally from 0 to 3% by weight, preferably 0 to 2% by weight and further preferred from 0 to 1% by weight. CaO may promote the desired dispersion properties (short flint). In a particular preferred embodiment the glass is free of CaO.

Preferably, the content of SrO and BaO is each at most 4% by weight. The content of MgO is preferably at most 3% by weight. The content of ZnO is preferably at most 2% by weight.

Exceeding these alkaline earth oxide upper limits would lead to a decreased refractive index and an increased Abbe number and would thereby lead out of the optical position range favored herein.

According to the invention, the glasses also comprise alkali oxides. Preferably, each of the alkali metal oxides $Na_2O$, $K_2O$ and $Li_2O$ is contained in the glass of the invention.

According to preferred embodiments of the glasses of the invention, the sum $R_2O$ of the alkali metal oxides $Na_2O$, $K_2O$ and $Li_2O$ should be 10.5 to 13.5% by weight, further preferred from 10.8 to 13% by weight. Preferably, the sum $R_2O$ of the alkali metal oxides $Na_2O$, $K_2O$ and $Li_2O$ is more than 10.8% by weight and further preferred more than 11% by weight. Preferably, the sum $R_2O$ of the alkali metal oxides $Na_2O$, $K_2O$ and $Li_2O$ is at most 13.5% by weight, even further preferred at most 13% by weight. Higher amounts of alkali oxides lead to an unacceptably strong influence in the direction of low refractive indices. Low amounts are disadvantageous for the melting properties of the glass. The indicated sum of alkali metal oxides should be in the indicated ranges, for achieving the meltability of the glasses on the one hand and on the other hand the $P_{g,F}$ and/or $\Delta P_{g,F}$ as preferred herein.

Preferably, the glasses of the invention comprise a content of $Na_2O$ of at least 2.0% by weight, more preferred of at least 3.0% by weight and even more preferred of at least 3.5% by weight. Preferably, the glasses of the invention comprise a content of $Na_2O$ of at most 8% by weight, preferably less than 8% by weight, even more preferred at most 7% by weight and most preferred of at most 6% by weight. Preferably, the glasses of the invention comprise a content of $Na_2O$ of 2 to <8% by weight, more preferred at least 3% by weight and at most 7% by weight, further preferred 3.5 to 6% by weight. $Na_2O$ serves for adjustment of the desired dispersion properties, thus the short flint character. Smaller amounts would in contrast not result in the desired effect.

Preferably, the glasses of the invention comprise a content of $K_2O$ of at least 0.3% by weight, more preferred at least 0.5% by weight and even more preferred at least 1% by weight. The content of $K_2O$ should preferably be at most 7% by weight and more preferred at most 6% by weight.

Preferably, the content of $K_2O$ in the glass is 0.3 to 7% by weight, more preferred 0.5 to 6% by weight and further preferred 1 to 6% by weight.

Moreover, $Na_2O$ and $K_2O$ serve in combination with $Li_2O$ for flexibly fine-tuning both the optical position and the temperature-viscosity-profile in favor of an optimal meltability and hot forming. Preferably, the glasses of the invention comprise a content of $Li_2O$ of at least 0.5% by weight, more preferred at least 1.0% by weight and even more preferred at least 1.5% by weight. The content of $Li_2O$ should preferably be at most 3.5% by weight, more preferred at most 3.0% by weight. Preferably, the content of $Li_2O$ in the glass is at least 0.5 up to at most 3.5% by weight.

It has turned out to be particularly advantageous, when the glasses of the invention have a proportion of $Na_2O$, which is at least as high as the proportion of $Li_2O$. Preferably, the glass of the invention contains a higher amount of $Na_2O$ than of $Li_2O$. Preferably, the ratio of the proportions of $Na_2O$ and $Li_2O$ is at least 1.0, preferably at least 1.5, more preferably at least 1.6 and even more preferably at least 2.0.

It has turned out to be particularly advantageous, when the glasses of the invention have a molar proportion of $Li_2O$, which is at most as high as the molar proportion of $Na_2O$. Preferably, the glass of the invention contains a lower molar proportion of $Li_2O$ than of $Na_2O$. Preferably, the ratio of the molar proportions of $Na_2O$ to $Li_2O$ is at least 0.7, preferably at least 0.8, more preferred at least 0.9. The ratio is preferably limited to at most 3, further preferably at most 2.5 and more preferred at most 2.2. A higher amount of $Li_2O$ may negatively affect the resistance of the glass.

It has turned out to be particularly advantageous, when the glasses of the invention have a molar proportion of $Na_2O$, which is at least as high as the molar proportion of $K_2O$. Preferably, the glass of the invention contains a higher molar proportion of $Na_2O$ than of $K_2O$. Preferably, the ratio of the molar proportions of $Na_2O$ and $K_2O$ is at least 1.0, preferably at least 1.3, more preferred at least 1.4 and even more preferred at least 1.5. The ratio is preferably limited to at most 6, further preferred at most 5 and more preferred at most 4. A higher molar proportion of $K_2O$ may negatively affect the resistance of the glass, but may also increase the coefficient of thermal expansion.

Along with $B_2O_3$, alkali oxides ensure a meltability in different-sized and thus also in small production aggregates with high quality. Therefore, a minimum amount of $B_2O_3$ and alkali oxides, thus in sum of from 20 to 30% by weight, is advantageous. In contrast, higher amounts result in an increased attack and thereby in a strong introduction of the refractory material into the glass and to lower life-times of the aggregates. As far as platinum is used as refractory material, this leads to loss of transmittance at the blue spectral edge, and also, as with the use of ceramic materials, due to the introduction of heterogeneous crystallization nuclei to increased crystallization tendency in the melt, and in the primary and secondary hot forming.

The use of economically and/or ecologically unfavorable and in particular transmittance-reducing components can be reduced in the glasses of the invention in favor of inexpensive, available materials that are not absorbing in the required transmittance range, or preferably such components can be completely avoided. In particular, components that are on a high price level due to globally and also locally limited reserves, as for example $Ta_2O_5$ and $GeO_2$, are advantageously reduced with regard to their amount in the glass, or these components may preferably be completely avoided. Thereby it is also ensured that the glass can be provided in the future. Moreover, glasses with increased chemical resistance are getting continuously more and more important for use in products of high quality.

Preferably, a glass of the present invention contains less than 1% by weight of PbO. Particularly preferably, a glass of the present invention is free of PbO.

Preferably, a glass of the present invention contains less than 1% by weight of $As_2O_3$. Particularly preferably, a glass of the present invention is free of $As_2O_3$.

Preferably, the glasses of the invention contain less than 1% by weight of $Bi_2O_3$. Particularly preferably, a glass of the present invention is free of $Bi_2O_3$. Moreover, $Bi_2O_3$ may lead to strong discolorations in the glass due to its susceptibility towards the redox-conditions in the melting process. The process windows of such glasses are extremely narrow and thus usually uneconomic for classical optical glasses.

$TiO_2$ increases the refractive index and has, in particular together with $ZrO_2$, a nuclei-forming effect, and impairs the transmittance in the blue spectral range and therefore shifts the UV-edge towards the longer-wavelengths range. Therefore, preferred embodiments of the glasses of the invention preferably contain less than 1% by weight of $TiO_2$. Preferably, glasses of the invention are free of $TiO_2$.

$CeO_2$ may shift the UV-edge towards the longer-wavelengths range. Preferred embodiments of the glasses of the invention preferably contain less than 1% by weight of $CeO_2$. Preferably, glasses of the invention are free of $CeO_2$.

Preferably, the glasses of the invention contain less than 1% by weight of $Gd_2O_3$. Particularly preferably, a glass of the present invention is free of $Gd_2O_3$. Gadolinium belongs to the Lanthanoids and has an absorption band at about 590 nm. However, the transmittance should be constantly high in the entire visible (VIS) range. This cannot be guaranteed with a proportion of more than 1% by weight $Gd_2O_3$.

Preferably, the glasses of the invention contain less than 1% by weight of $Y_2O_3$. Particularly preferably, a glass of the present invention is free of $Y_2O_3$. Yttrium oxide occurs naturally as part of different Yttrium minerals, as for example Samarskite or Yttrobetafite, and may be present in the glass of the invention; however, it is expensive.

Preferably, the glasses of the invention contain less than 1% by weight of $GeO_2$. Particularly preferably, a glass of the present invention is free of $GeO_2$, in particular because $GeO_2$ is on a high price level due to the globally and also locally limited reserves.

Preferably, the glasses of the invention contain less than 1% by weight of $Ta_2O_5$. Particularly preferably, a glass of the present invention is free of $Ta_2O_5$, in particular because Ta raw materials are on a high price level due to the globally and also locally limited reserves.

Preferably, the glasses of the invention contain less than 1% by weight of $WO_3$. Particularly preferably, a glass of the present invention is free of $WO_3$. A too high amount of $WO_3$ may easily shift the UV-edge into the longer-wavelengths range.

According to most embodiments, the glass of the invention preferably contains less than 1% by weight, more preferred no $Al_2O_3$ as additional network former. This component is attributed to an increase in crystallization resistance in many glass systems. However, the glass of the invention is sufficiently stable in this regard and can be handled well also without this component. To the contrary, the proportion of $Al_2O_3$ may even be reduced, or preferably completely avoided because it adversely affects high transmittance in UV in this glass system of the invention.

For more flexibly adjusting a specific point within the achievable optical position range, the glasses of the invention may additionally contain oxides of the group $La_2O_3$ and $HfO_2$ in a total amount of at most 1% by weight. $La_2O_3$ and $HfO_2$ reduce the dispersion and may thus contribute to achieving the short flint character. According to most embodiments, the glass of the invention preferably contains less than 1% by weight, more preferred no $La_2O_3$. Lanthanum oxide reduces the chemical resistance and Hafnium oxide may additionally lead to an increase in the crystallization tendency of optical glasses. Therefore, the proportion must not exceed the indicated upper limit.

Preferably, at most up to 1 mol-% of the oxide ions ($O^{2-}$) are replaced by fluoride ions ($F^-$) in the glass of the invention based on the indicated compositions. Preferably, the glasses of the invention are free of fluoride ions. Fluoride ions ($F^-$) may in particular disadvantageously increase the negative anomalous partial dispersion preferred herein.

The glasses of the invention contain $ZrO_2$ and preferably additionally $Nb_2O_5$ for adjusting the refractive index and the Abbe number. Thereby, the desired high negative anomalous partial dispersion in combination with the optical position ($n_d$, $v_d$) is achieved amongst other things. In particular, $v_d$ may be shifted towards lower values at identical or similar $P_{g,F}$, which favorably affects a more negative value of the anomalous partial dispersion. The desired optical position, in particular a moderate refractive index and Abbe value, could not be achieved with lower amounts, in particular of $ZrO_2$ or $Nb_2O_5$, as indicated. Higher amounts, however, may increase the herein preferred dispersion, indicated as $P_{g,F}$, and thereby reduce the deviation from the dispersion normal line and thereby in turn reduce the short flint character of the glasses.

Preferably, the glasses of the invention contain an amount of $ZrO_2$ of at most 20% by weight, preferably of at most 19% by weight. However, preferably the amount of $ZrO_2$ is at least 10% by weight, preferably more than 10% by weight, further preferred more than 12% by weight, further preferred more than 13% by weight, even further preferred more than 15% by weight, particularly preferred of at least 16% by weight. The proportion of $ZrO_2$ is advantageously in this glass system for achieving the high negative partial dispersion. At that, exceeding the indicated amount may significantly impair the meltability in smaller aggregates and in particular lead to strong crystallization. Preferably, a glass of the invention has an amount of $ZrO_2$ of 13-19% by weight, preferably of 15-19% by weight, further preferred of 16 to 19% by weight. Preferably, the amount of $ZrO_2$ in the glasses of the invention is higher than the amount of $B_2O_3$. In particular, the ratio of $ZrO_2$ to $B_2O_3$ is more than 1.0. Thereby, the glass of the invention may in particular be provided as a highly chemically resistant glass. Preferably, the ratio of $ZrO_2$-content to $B_2O_3$-content is not higher than 1.6, preferably not higher than 1.5 because this may disadvantageously affect the meltability, in particular in small aggregates.

Preferably, the glasses of the invention contain an amount of $Nb_2O_5$ of at least 7% by weight, preferably of at least 8% by weight. Preferably, the glasses of the invention have a content of $Nb_2O_5$ of at most 20% by weight, preferably less than 20% by weight, further preferred at most 16% by weight, and particularly preferred at most 15% by weight. Particularly preferred is a content of $Nb_2O_5$ of 7 to at most 20% by weight, further preferred of 8 to 16% by weight, more preferred of at least 10% by weight to 15% by weight, further preferred of >10% by weight to 15% by weight and even further preferred of >10% by weight to <13.5% by weight.

The sum of $Nb_2O_5$ and $ZrO_2$ in the glasses of the invention is preferably at least 25% by weight and at most 35% by weight. In a preferred embodiment the same applies for the sum of $La_2O_3$, $Nb_2O_5$ and $ZrO_2$.

It has turned out to be advantageous in the glasses of the invention, when preferably an amount of $ZrO_2$ is approximately equal to the sum $R_2O$, thus to the content of the alkali metal oxides $Na_2O$, $K_2O$ and $Li_2O$. Particularly preferred is a ratio of the content of $ZrO_2$ to $R_2O$ of less than 1.7, further preferred of at most 1.6. Particularly preferred, the ratio of the content of $ZrO_2$ to the sum of $B_2O_3$ and $R_2O$ is less than 0.9, further preferred at most 0.8. This ratio is particularly advantageous for achieving a complete melting of the $ZrO_2$-proportion in the glass.

It has also turned out to be advantageous in the glasses of the invention, when preferably the ratio of the sum of the amounts in % by weight of the components $SiO_2$, $Nb_2O_5$, $Ta_2O_5$, $ZrO_2$, $HfO_2$ and the sum of the amounts of $B_2O_3$, $Li_2O$, $K_2O$, $Na_2O$, $MgO$, $CaO$, $SrO$, $BaO$, $ZnO$ and $La_2O_3$, is at least 1.5, preferably at least 1.7 and more preferred at least 2, preferably, however, at most 3.5. Particularly preferred, the sum of the contents of the components $SiO_2$, $Nb_2O_5$, $Ta_2O_5$, $ZrO_2$, $HfO_2$ is more than 68% by weight, preferably more than 70% by weight. This may advantageously ensure a desired high chemical resistance. At that, the upper limit should not exceed 80% by weight so that the glass can still be melted economically.

The glass of the invention may contain usual refining agents in small amounts. Preferably, the sum of the added refining agents is at most 2.0% by weight, more preferred at most 1.0% by weight, further preferred at most 0.5% by weight. A refining agent of the present invention is preferably selected from the group comprising $Sb_2O_3$, $SnO_2$, $SO_4^{2-}$, NaCl and $As_2O_3$. As refining agent in the glass of the invention $Sb_2O_3$ may be present in 0-1 in % by weight, in addition to the remaining glass composition. Additionally or alternatively $SnO_2$ may be present as refining agent in 0-1 in % by weight, in addition to the remaining glass composition. Additionally or alternatively $SO_4^{2-}$ may be present as refining agent in 0-1 in % by weight, in addition to the remaining glass composition. Additionally or alternatively NaCl may be present as refining agent in 0-1 in % by weight, in addition to the remaining glass composition. Additionally or alternatively $As_2O_3$ may be present as refining agent in 0-0.1 in % by weight, in addition to the remaining glass composition. Also $F^-$ may additionally be added as refining agent. Additionally or alternatively $F^-$ may be present as refining agent in 0-1 in % by weight, in addition to the remaining glass composition. However, $F^-$ may influence the $\Delta P_{g,F}$ in the suggested glass system towards an undesired more positive value. Therefore, $F^-$ is preferably not added to the glasses of the present invention or only in very small amounts as a refining agent. In other words, the glass of the invention is preferably free of $F^-$.

In a particularly preferred embodiment, the optical glass of the present invention comprises the following composition (in % by weight based on oxide)

| | |
|---|---|
| $SiO_2$ | 38-47 |
| $B_2O_3$ | >12-17 |
| $SiO_2 + B_2O_3$ | ≥50-65 |
| $Li_2O$ | 0.5-3.5 |
| $Na_2O$ | 2-<8 |
| $K_2O$ | 0.3-7 |
| Σ $R_2O$ (R = Li, Na, K) | >10-14 |
| MgO | 0 4 |
| CaO | 0-3 |
| SrO | 0-4 |
| BaO | 0-<4 |

-continued

| | |
|---|---|
| ZnO | 0-2 |
| Σ MO (M = Mg, Ca, Sr, Ba, Zn) | 0-<5 |
| La$_2$O$_3$ | 0-<1 |
| ZrO$_2$ | >10-20 |
| Nb$_2$O$_5$ | 7-20 |
| Σ Oxide (La, Nb, Zr) | 25 ≤35 |

In another particularly preferred embodiment, an optical glass of the invention comprises the following composition (in % by weight based on oxide)

| | |
|---|---|
| SiO$_2$ | 40-46 |
| B$_2$O$_3$ | 12.2-17 |
| SiO$_2$ + B$_2$O$_3$ | >50-65 |
| Li$_2$O | 0.5-3 |
| Na$_2$O | 3-7 |
| K$_2$O | 0.5-6 |
| Σ R$_2$O (Li, Na, K) | 10.5-14 |
| MgO | 0-3 |
| CaO | 0-2 |
| SrO | 0-3 |
| BaO | 0-3 |
| ZnO | 0-1 |
| Σ MO (Mg, Ca, Sr, Ba, Zn) | ≤3 |
| La$_2$O$_3$ | ≤0.5 |
| ZrO$_2$ | 13-19 |
| Nb$_2$O$_5$ | 8-16 |
| Ratio Oxides I/Oxides II | |
| Σ Oxides I (Si, Nb, Ta, Zr, Hf); Σ Oxides II (B, Li, Na, K, Mg, Ca, Sr, Ba, Zn) | ≥1.7 ≤3.5 |

As an optical glass, the glass of the invention is preferably free of coloring and/or optically active, such as laser-active components.

According to an alternative embodiment of the present invention, namely provided that the glass is used as basic glass of an optical filter or of a solid-state laser, the glass of the invention may contain coloring and/or optically active such as laser-active components in amounts of up to 5% by weight (in addition to the glass composition described herein). Coloring components are preferably selected from the group comprising CeO$_2$, Fe$_2$O$_3$, Cr$_2$O$_3$, CuO, CoO, NiO. Laser-active components are preferably selected from the group comprising Pr$_2$O$_5$, Nd$_2$O$_5$, Eu$_2$O$_5$, Tb$_2$O$_5$, Ho$_2$O$_5$, Er$_2$O$_5$, Tm$_2$O$_5$, Yb$_2$O$_5$.

In particular, the amount of CuO in the glasses of the invention is preferably less than 0.15% by weight, more preferably less than 0.1% by weight, even more preferably less than 0.05% by weight. Particularly preferably the glass of the invention is free of CuO.

Preferably, the glass of the invention is melted under non-reducing conditions because otherwise easily reducible components may lead to yellow or brown coloring and the glass could than no longer be used as optical glass. The glass of the invention has preferably a high transmittance in the wavelength region of from 320 nm to 800 nm. A significant absorption in the UV region up to 400 nm is not desired in the glass of the invention. The UV edge should preferably be open as far as possible into the short-wavelength region, thus the glass should have a high transmittance. Preferably, the glass of the invention as an optical glass is free of coloring and/or optically active components, for example laser-active components. Coloring components include CuO and Cu metal colloids.

The glasses of the invention preferably have a $T_g$ of from ≥480° C. to ≤560° C., further preferred from ≥500° C. to ≤560° C. Preferably, the glasses have a $T_g$ of ≤800° C., further preferred of ≤750° C., further preferred of ≤700° C. and even further preferred of ≤600° C. The glasses of the invention preferably have a coefficient of thermal expansion _ in the temperature range of from 20 to 300° C. of from $5*10^{-6}$/K up to less than $8*10^{-6}$/K auf. Thereby, problems with thermal stress in the further processing such as for example in cold finishing processes such as polishing and/or dissociating can be avoided.

Preferably, the value $\Delta T(T(\eta)$ at $10^{7,6}$–$T(\eta)$ at $10^{13})$ of the glasses of the invention is more than 150 K. Shorter glasses are often also very short in the low-viscosity range (<$10^5$ dPas), which makes hot forming difficult.

The glasses of the invention preferably have specific densities of at most 3 g/cm$^3$. Thereby, optical elements and/or optical components can be made out of the glasses of the invention, which are particularly suitable for mobile/movable units due to their relatively small mass, in particular relative to lead-containing counterparts.

The glasses of the present invention preferably have a comparably high transmittance in the UV region, in particular in a wavelength region of from 320 nm to 400 nm. FIG. 1 shows exemplarily the internal transmittance curve of example glass 2 at a sample thickness of 10 mm. Notably, example glass 2 underlying FIG. 1 was melted in a platinum crucible. Even higher internal transmittance is achieved if the glass is produced in a quartz glass tank.

According to the present invention, the wavelength at which the internal transmittance is 50% is termed $\lambda_c$. As can be seen in FIG. 1, internal transmittance is smaller than 50% at wavelengths smaller than $\lambda_c$ and higher than 50% at wavelengths higher than $\lambda_c$. The term $\lambda_c$ (10 mm) denotes the value for $\lambda_c$ at a substrate thickness of 10 mm. Preferably, the glasses of the invention have a $\lambda_c$ (10 mm) of at most 365 nm, more preferably at most 355 nm, more preferably at most 345 nm and even more preferably at most 335 nm.

The UV edge (position of the transmittance edge towards the UV region) may also be characterized with regard to its steepness. A measure for the steepness of the UV edge is the so called color code. Provided are the wavelengths $\lambda_{80}$ and $\lambda_5$ at which the transmittance (including reflection losses) at a sample thickness of 10 mm is 0.80 or 0.05, respectively. The color code is provided in the form of $\lambda_{80}/\lambda_5$ wherein the values are rounded to 10 nm and the last digit is omitted. For example, a color code of 33/30 means that the rounded values are $\lambda_{80}$=330 nm and $\lambda_5$=300 nm, respectively. According to the invention, with regard to the unrounded values $\lambda_{80}$ is higher than $\lambda_5$. However, due to the rounded values presented as color code $\lambda_{80}/\lambda_5$ the values prior and subsequent to the slash may be equal. However, the value subsequent to the slash cannot be higher than the value prior to the slash. Usually, the value prior to the slash is higher than the value subsequent to the slash. With regard to the glasses of the present invention, $\lambda_{80}$ is preferably in a range of from 330 nm to 480 nm, more preferably of from 330 nm to 470 nm. The values for $\lambda_5$ are preferably in a range of from 310 nm to 360 nm, more preferably of from 310 nm to 350 nm. Thus, the glasses of the invention preferably have a color of 33-48/31-36, more preferably of 33-47/31-35, wherein the value prior to the slash is at least as high as the value subsequent to the slash.

The present invention further relates to the use of the glasses of the invention for or in optical elements. The present invention further relates to such optical elements, which comprise the glass of the invention. Optical elements may in particular be lenses, prisms, light guide rods, arrays, optical fibers, gradient components, optical windows and compact components. The use of the glasses of the invention is particularly advantageous in the application fields comprising imaging, sensor technology, microscopy, medical technology, digital projection, telecommunication, optical telecommunications/information transfer, optics/illumination in camera objectives, binoculars and in the automotive sector, photolithography, stepper, excimer laser, wafer, computer chips, as well as integrated circuits and electronic devices, which comprise such circuits and chips.

Even further the present invention comprises optical parts or optical components for imaging, sensor technology, microscopy, binoculars, medical technology, digital projection, telecommunication, optical telecommunications/information transfer, optics/illumination in the automotive sector, photolithography, stepper, excimer laser, wafer, computer chips and/or integrated circuits and electronic devices, which contain such circuits and chips, comprising one or more optical elements in accordance with the present invention.

Even further the invention relates to the use of such an optical element for producing optical parts or optical components, in particular for sensor technology, microscopy, binoculars, medical technology, digital projection, telecommunication, optical telecommunications/information transfer, optics/illumination in the automotive sector, photolithography, stepper, excimer laser, wafer, computer chips and/or integrated circuits and electronic devices, which contain such circuits and chips.

All described embodiments of the invention have the advantage that the glasses of the invention have a pronounced short flint character and in addition have an excellent transmittance and chemical resistance and workability. The glasses of the invention can stand out due to lower costs of production caused by decreased costs of raw materials and decreased processing costs, due to their crystallization properties that can be handled also in small melting aggregates, and due to good environmental compatibility.

In particular, a preferred adjustment of optical position, viscosity-temperature-profile and processing temperature is achieved by the glasses of the invention so that a highly specific hot forming close to the final geometry is guaranteed also with sensitive precision machines. Moreover, all glasses of the invention have a good chemical resistance and can be handled well with regard to the crystallization properties. They are further characterized by good meltability and flexible, close-to-final-geometry workability. Furthermore, a correlation of crystallization stability and viscosity-temperature-profile was realized so that a further thermal treatment, such as pressing or re-pressing of the glasses, is easily possible.

The glasses of the invention are particularly advantageously processable in a pressing process and have low transformation temperatures $T_g$. Furthermore, the glasses of the invention can be melted and processed well and they have a sufficient crystallization resistance, which enables a production in continuously run aggregates.

The glasses of the invention are particularly suitable for use in the application fields imaging as lenses in objectives for digital projection (for example objectives, binoculars, microscopes, projectors, mobile communications cameras, mobile drive), sensor technology, medical technology, photolithography, laser technology, wafer/chip technology, as well as for telecommunication, optical telecommunications and optics/illumination in the automotive sector.

Examples

Table 2 contains examples for preferred composition ranges. The glasses described in the examples have been produced as follows:

The raw materials for the oxides, preferably the corresponding carbonates, are weighed out, one or more refining agents, such as for example $Sb_2O_3$, are added and subsequently mixed well. The glass mixture is melted at about 1450° C. in a discontinuous melting aggregate, subsequently refined (1480° C.) and homogenized. At a casting temperature of about 1450° C. the glass can be cast and be processed into the desired dimensions. Based on experience, the temperatures may be reduced by at least 100 K in a high-volume continuous aggregate, and the material can be processed in the close-to-final-geometry hot forming process.

TABLE 1

Melting example for 100 kg calculated glass:

| Oxide | % by weight | Raw material | Weighed portion (kg) |
|---|---|---|---|
| $SiO_2$ | 43.8 | $SiO_2$ | 43.79 |
| $B_2O_3$ | 13.5 | $H_3BO_3$ | 23.94 |
| $Li_2O$ | 2.2 | $Li_2CO_3$ | 5.46 |
| $Na_2O$ | 4.8 | $Na_2CO_3$ | 6.69 |
|  |  | $NaNO_3$ | 2.72 |
| $K_2O$ | 4.8 | $K_2CO_3$ | 7.06 |
| $ZrO_2$ | 17.2 | $ZrO_2$ | 17.22 |
| $HfO_2$ | 0.39 | $HfO_2$ | 0.40 |
| $Nb_2O_5$ | 13.3 | $Nb_2O_5$ | 13.30 |
| $Sb_2O_3$ | 0.15 | $Sb_2O_3$ | 0.15 |
| Sum | 100.15 |  | 120.72 |

The properties of the thus obtained glass are indicated in table 2 as example 1 and has in addition to the measured values presented there excellent chemical resistances characterized by AR=class 1.0 and SR=class 1.0.

TABLE 2

Melting examples (in % by weight)

| | Ex. | | | | | | | | |
|---|---|---|---|---|---|---|---|---|---|
| | 1 % by weight | 2 % by weight | 3 % by weight | 4 % by weight | 5 % by weight | 6 % by weight | 7 % by weight | 8 % by weight | 9 % by weight |
| $SiO_2$ | 43.80 | 45.00 | 44.80 | 44.10 | 40.00 | 46.00 | 44.00 | 43.35 | 44.00 |
| $B_2O_3$ | 13.50 | 15.10 | 13.40 | 13.90 | 17.00 | 12.50 | 13.90 | 16.50 | 16.50 |
| $Al_2O_3$ | | | | | | | | | |
| $Li_2O$ | 2.20 | 2.24 | 2.10 | 2.30 | 1.50 | 3.00 | 2.20 | 2.50 | 2.50 |
| $Na_2O$ | 4.80 | 4.90 | 4.90 | 4.80 | 6.50 | 4.90 | 4.80 | 7.00 | 7.00 |
| $K_2O$ | 4.80 | 4.80 | 4.90 | 4.80 | 5.80 | 3.60 | 4.80 | 1.80 | 1.80 |
| MgO | | | | | | | | | |

TABLE 2-continued

Melting examples (in % by weight)

|  | | | | | | | | | |
|---|---|---|---|---|---|---|---|---|---|
| CaO | | | | | 0.38 | | | | |
| SrO | | | | | | | | | |
| BaO | | | | | | | 0.50 | | |
| $La_2O_3$ | | | | | | | | 0.50 | 0.50 |
| $Nb_2O_5$ | 13.30 | 10.10 | 11.90 | 12.00 | 9.00 | 14.30 | 12.00 | 11.20 | 10.70 |
| ZnO | | 0.08 | | | | | | | |
| $ZrO_2$ | 17.20 | 17.30 | 17.60 | 17.30 | 19.50 | 15.00 | 17.30 | 17.00 | 17.00 |
| $HfO_2$ | 0.39 | 0.39 | 0.40 | 0.39 | 0.50 | 0.60 | 0.35 | | |
| $Sb_2O_3$ | 0.15 | 0.15 | 0.14 | 0.14 | 0.20 | 0.10 | 0.15 | 0.15 | 0.15 |
| Σ | 100.14 | 100.06 | 100.1 | 100.11 | 100.00 | 100.00 | 100.00 | 100.00 | 100.15 |

Properties

|  | | | | | | | | | |
|---|---|---|---|---|---|---|---|---|---|
| $n_d$ (20 K/h) | 1.619 | 1.605 | 1.612 | 1.615 | 1.606 | 1.617 | 1.612 | 1.609 | 1.608 |
| $v_d$ (20 K/h) | 43.27 | 45.66 | 44.38 | 44.17 | 45.75 | 43.90 | 44.30 | 44.95 | 45.23 |
| $P_{g,F}$ | 0.5630 | 0.5578 | 0.5606 | 0.5613 | 0.5572 | 0.5620 | 0.5608 | 0.5590 | 0.5585 |
| $\Delta P_{g,F}$ | −0.0080 | −0.0092 | −0.0086 | −0.0083 | −0.0096 | −0.0080 | −0.0084 | −0.0091 | −0.0092 |
| $\alpha_{(20-300° C.)}$ $[10^{-6}/K]$ | 6.79 | 6.90 | 6.79 | 6.86 | 7.40 | 6.89 | 6.86 | 6.93 | 6.89 |
| Tg [° C.] | 537 | 531 | 536 | 537 | 521 | 515 | 536 | 508 | 511 |
| ρ [g/cm³] | 2.82 | 2.77 | 2.80 | 2.81 | 2.78 | 2.81 | 2.80 | 2.79 | 2.79 |
| $\lambda_c$ (10 mm) [nm] | 337 | 329 | 337 | 333 | n.d. | n.d. | n.d. | n.d. | n.d. |

| Ex. | 10 % by weight | 11 % by weight | 12 % by weight | 13 % by weight | 14 % by weight | 15 % by weight | 16 % by weight | 17 % by weight |
|---|---|---|---|---|---|---|---|---|
| $SiO_2$ | 45.50 | 45.67 | 45.60 | 46.60 | 45.90 | 45.96 | 45.10 | 45.00 |
| $B_2O_3$ | 13.10 | 13.00 | 13.20 | 12.40 | 13.10 | 13.00 | 13.70 | 13.80 |
| $Al_2O_3$ | 0.11 | | | | | | | |
| $Li_2O$ | 2.20 | 2.18 | 2.28 | 2.11 | 2.14 | 2.17 | 2.25 | 2.27 |
| $Na_2O$ | 4.82 | 4.83 | 4.81 | 4.78 | 4.83 | 4.83 | 4.88 | 4.91 |
| $K_2O$ | 4.48 | 4.49 | 4.42 | 4.31 | 4.50 | 4.52 | 4.59 | 4.59 |
| MgO | | | | | | | | |
| CaO | | | | | | | | |
| SrO | | | | | | | | |
| BaO | | | | | | | | |
| $La_2O_3$ | | | | | | | | |
| $Nb_2O_5$ | 11.80 | 11.80 | 11.80 | 11.90 | 11.80 | 11.80 | 11.72 | 11.80 |
| ZnO | | | | | | | 0.06 | 0.17 |
| $ZrO_2$ | 17.50 | 17.50 | 17.40 | 17.40 | 17.20 | 17.20 | 17.20 | 16.95 |
| $HfO_2$ | 0.38 | 0.39 | 0.39 | 0.39 | 0.38 | 0.38 | 0.38 | 0.37 |
| $Sb_2O_3$ | 0.14 | 0.14 | 0.14 | 0.14 | 0.14 | 0.14 | 0.14 | 0.14 |
| Σ | 100.0 | 100.0 | 100.0 | 100.0 | 100.0 | 100.0 | 100.0 | 100.0 |

Properties

| | | | | | | | | |
|---|---|---|---|---|---|---|---|---|
| $n_d$ (20 K/h) | 1.613 | 1.612 | 1.612 | 1.611 | 1.611 | 1.611 | 1.612 | 1.613 |
| $v_d$ (20 K/h) | 44.41 | 44.42 | 44.45 | 44.48 | 44.48 | 44.54 | 44.48 | 44.46 |
| $P_{g,F}$ | 0.5613 | 0.5613 | 0.5621 | 0.5617 | 0.5613 | 0.5615 | 0.5615 | 0.5616 |
| $\Delta P_{g,F}$ | −0.0078 | −0.0078 | −0.0069 | −0.0073 | −0.0077 | −0.0074 | −0.0075 | −0.0074 |
| $\alpha_{(20-300° C.)}$ $[10^{-6}/K]$ | n.d. | n.d. | n.d. | n.d. | n.d. | n.d. | n.d. | n.d. |
| Tg [° C.] | n.d. | n.d. | n.d. | n.d. | n.d. | n.d. | n.d. | n.d. |
| ρ[g/cm³] | n.d. | n.d. | n.d. | n.d. | n.d. | n.d. | n.d. | n.d. |
| $\lambda_c$ (10 mm) [nm] | 359 | 354 | 350 | 335 | 340 | 339 | n.d. | n.d. |

While the present disclosure has been described with reference to one or more exemplary embodiments, it will be understood by those skilled in the art that various changes may be made and equivalents may be substituted for elements thereof without departing from the scope of the present disclosure. Variations of the preferred embodiments mentioned herein may become apparent to those of ordinary skill in the art upon reading the foregoing descriptions. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims. Furthermore, the inventors expect skilled artisans to employ variations as appropriate to practice the disclosure in other forms than as specifically described herein. This includes all modifications and equivalents of the subject matter recited in the claims appended hereto as permitted by applicable law.

The invention claimed is:

1. An optical glass, comprising the following composition (in % by weight based on oxide):

| | |
|---|---|
| $SiO_2$ | ≥40-47 |
| $B_2O_3$ | >12-17 |
| $SiO_2 + B_2O_3$ | >52-65 |

-continued

| | |
|---|---|
| $ZrO_2$ | ≥10 |
| $Nb_2O_5$ | 0-20 |
| Σ $R_2O$ (R = Li, Na, K) | >10-14 |
| CuO | <0.005-. |

2. The glass according to claim 1, wherein the glass has at least one of a refractive index $n_d$ of 1.60 to 1.625, a negatively deviating anomalous partial dispersion of $\Delta P_{g,F}$ of at most −0.0055, and an Abbe number $v_d$ of 42.7 to 45.9.

3. The glass according to claim 1, wherein the glass has in sum a content of $SiO_2$ and $B_2O_3$ of at least 54% by weight.

4. The glass according to claim 1, wherein the glass has a content of CaO of 0-3% by weight.

5. The glass according to claim 1, wherein the glass has at least one of a content of $Li_2O$ of at least 0.5 to at most 3.5, a content of $Na_2O$ of at least 2.0 to at most 8.0, and a content of $K_2O$ of at least 0.3 to at most 7.0.

6. The glass according to claim 1, wherein the glass has a content of $ZrO_2$ of at most 20% by weight.

7. The glass according to claim 1, wherein the glass has a content of $Nb_2O_5$ of at least 7% by weight.

8. The glass according to claim 1, wherein the glass is free of at least one of $Ta_2O_5$, $GeO_2$ and $WO_3$.

9. A method of making an optical element, comprising the step of using the glass of claim 1 in the optical element.

10. The glass according to claim 1, wherein the glass has in sum a content of $SiO_2$ and $B_2O_3$ of at least 55% by weight.

11. The glass according to claim 1, wherein the glass has a content of CaO of 0 to 2% by weight.

12. The glass according to claim 1, wherein the glass has a content of CaO of 0 to 1% by weight.

13. The glass according to claim 1, wherein the glass is free of CaO.

14. The glass according to claim 1, wherein the glass has a content of $ZrO_2$ of at most 20% by weight and/or more than 12% by weight.

15. The glass according to claim 1, wherein the glass has a content of $ZrO_2$ of at most 19% by weight.

16. The glass according to claim 1, wherein the glass has a content of $ZrO_2$ of more than 12% by weight.

17. The glass according to claim 1, wherein the glass has a content of $ZrO_2$ of at least 15% by weight.

18. The glass according to claim 1, wherein the glass has a content of $ZrO_2$ of at least 16% by weight.

19. The glass according to claim 1, wherein the glass has a content of $Nb_2O_5$ of at least 9% by weight.

20. The glass according to claim 1, wherein the glass has a content of $Nb_2O_5$ of at most 16% by weight.

21. The glass according to claim 1, wherein the glass has a content of CuO of 0.001 wt % or less.

22. An optical glass, comprising the following composition (in % by weight based on oxide):

| | |
|---|---|
| $SiO_2$ | ≥40-47 |
| $B_2O_3$ | >12-17 |
| $SiO_2$ + $B_2O_3$ | >52-65 |
| $ZrO_2$ | ≥16 |
| $Nb_2O_5$ | 0-20 |
| Σ $R_2O$ (R = Li, Na, K) | >10-14. |

* * * * *